W. F. D. ACKERMANN.
MOTOR.
APPLICATION FILED SEPT. 22, 1919.
1,382,591.
Patented June 21, 1921.
2 SHEETS—SHEET 1.
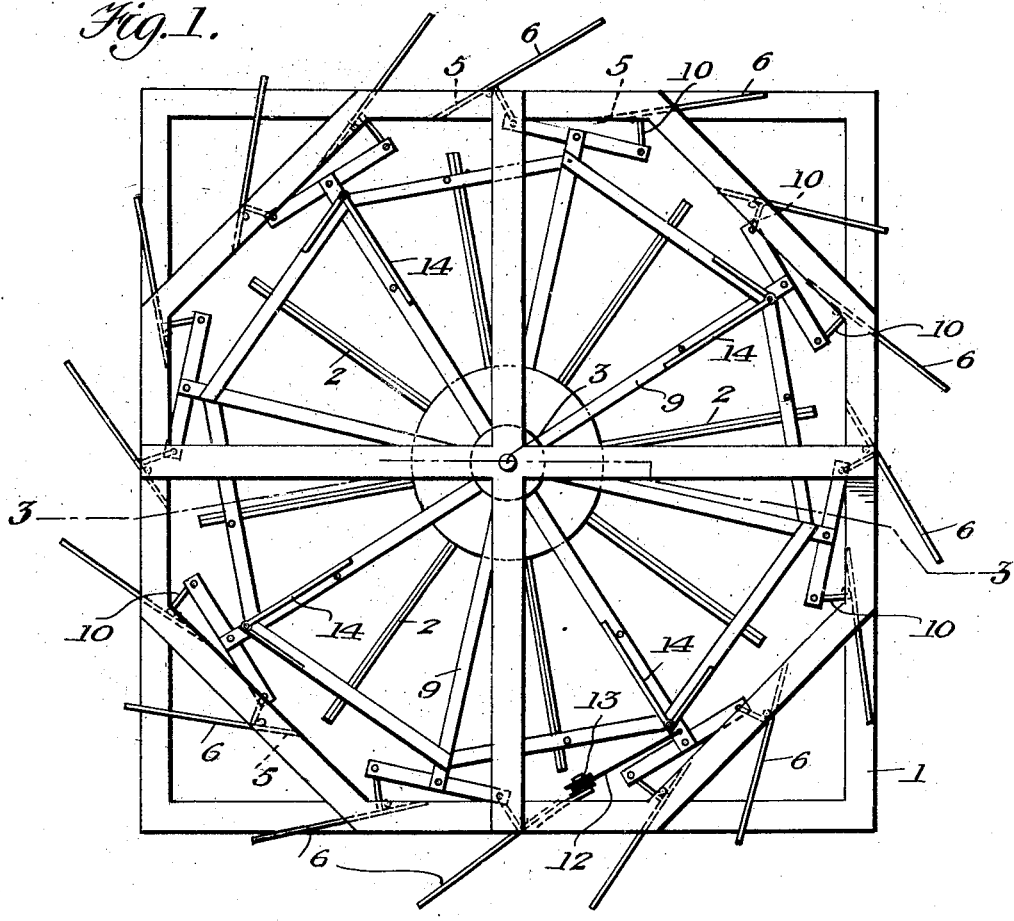
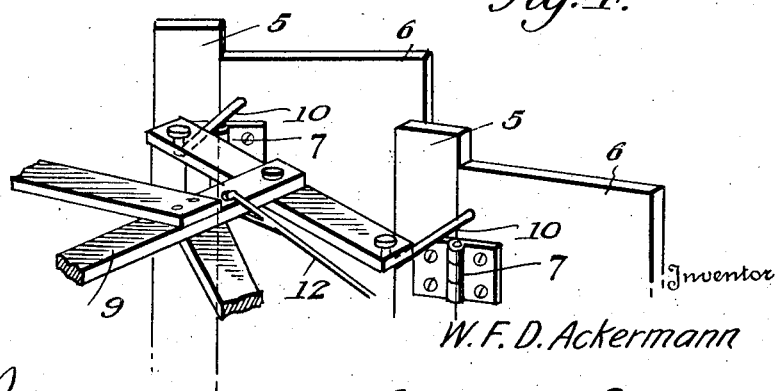
Witnesses
Geo. Ackman Jr.
Inventor
W. F. D. Ackermann
By Victor J. Evans
Attorney

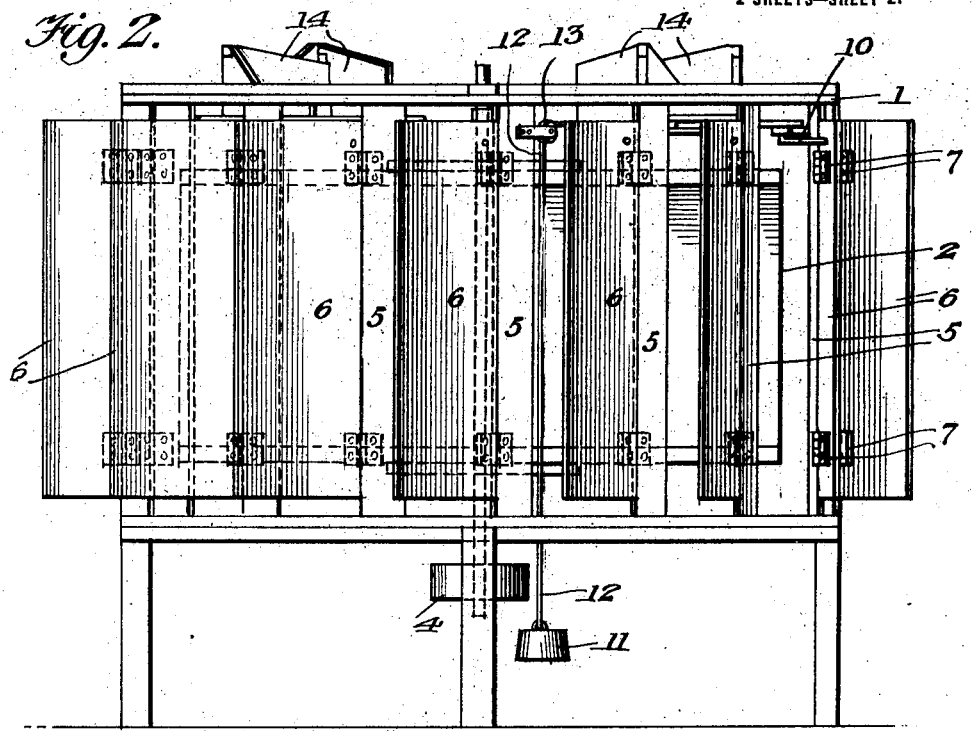
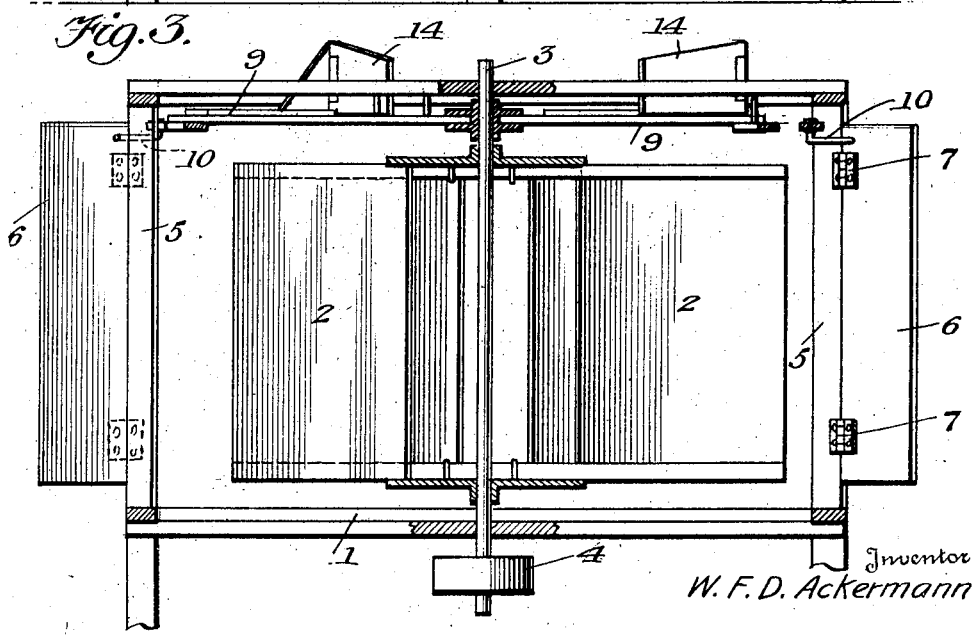

UNITED STATES PATENT OFFICE.

WILLIAM F. D. ACKERMANN, OF KAYLOR, SOUTH DAKOTA.

MOTOR.

1,382,591. Specification of Letters Patent. Patented June 21, 1921.

Application filed September 22, 1919. Serial No. 325,319.

*To all whom it may concern:*

Be it known that I, WILLIAM F. D. ACKERMANN, a citizen of the United States, residing at Kaylor, in the county of Hutchinson and State of South Dakota, have invented new and useful Improvements in Motors, of which the following is a specification.

This invention relates to an air-propelled motor and has for its primary object the construction of a motor in which the rotor is so arranged that it will be acted upon by the wind in the most efficient manner, provided the pressure of the wind is not increased beyond a predetermined degree.

An object of the invention is to provide means for preventing the wind from acting on the rotor when the pressure of the wind rises above a predetermined degree, such as takes place during a storm.

Besides the above, my invention is distinguished in the novel manner of constructing the vanes so that the deflector actuating portion of the invention may be actuated irrespective of the direction of travel of the wind.

With these and other objects in view the invention will be better understood from the following detailed description taken in connection with the accompanying drawings, wherein:

Figure 1 is a top plan view of the invention.

Fig. 2 is a side elevation.

Fig. 3 is a vertical section view.

Fig. 4 is a detail view of the vane deflectors.

Again referring to the drawings illustrating one manner of constructing the invention numeral 1 designates a frame within which is rotatably mounted the rotor 2. The shaft 3 of the rotor has connected thereto a pulley 4 so that power may be taken from the rotor. Fixed to the frame 1 is a series of stationary deflectors 5 arranged concentrically of the rotor so as to deflect the wind in a direction to act in the most efficient manner upon the rotor. Coöperating with the deflectors 5 are movable deflectors 6 hinged to the frame as indicated at 7. The area and arrangement of the movable deflectors are such that when moved to a closed position they will coöperate so as to completely inclose the rotor, and prevent the wind from acting on the rotor. This takes place when the pressure of the wind rises above a predetermined degree.

For giving movements to the deflectors 6 I provide a second frame 9 mounted to have movements on frame 1. At spaced intervals this frame 9 is connected to the deflectors 6 by links 10 so that in the movement of the frame 9 the deflectors will be moved to open or closed positions. For moving the frame 9 in a direction to hold the deflectors 6 in open position I provide a weight 11 attached to the cable 12, passed around suitably disposed pulleys 3, and connected to the frame 9 in a manner to exert a pull thereon. For the purpose of overcoming the effect of this weight when the wind rises above a predetermined degree I provide the vanes 14 pivotally mounted on the frame 9 and of such a shape that the pressure of the wind on certain vanes will be greater than on others so that the frame 9 will be turned in a direction to raise the weight 11 and throw the deflectors 6 to a closed position.

From the foregoing description taken in connection with the accompanying drawings it should be apparent that I provide an apparatus of substantial construction in which the rotor will be efficiently protected against violent strains, thereby prolonging the life of the apparatus. A feature of the invention is the novel manner of arranging the deflectors so that the wind will be directed in a direction to act the most efficiently upon the blades of the rotor.

It is of course to be understood that the invention may be constructed in various other manners than illustrated, and the parts associated in other relations, and therefore I do not desire to be limited in any manner except as set forth in the claim hereunto appended.

What I claim is:—

A wind motor comprising a stationary supporting frame, a rotor mounted within the frame, a plurality of vertically extending stationary plates carried by the frame and constituting stationary deflectors for leading wind onto the rotor, a plurality of deflecting plates hinged upon the edges of said stationary plates and movable whereby to partially or entirely inclose the rotor, a relatively movable frame capable of having arcuate movement within the frame irrespective of the movement of the rotor, said movable frame including radial arms terminating in cross bars, links pivotally connected with the ends of each cross bar and with the adjacent hinged deflecting plate, a cable connected with one of said arms, trained over a guide and carrying a weight normally holding said movable frame in such position that the hinged plates will be in open position, and vanes mounted upon the top of said movable frame and impinged against by the wind for counterbalancing the weight and effecting movement of the movable frame to swing the hinged plates to close position when the wind becomes excessive.

In testimony whereof I affix my signature.

WILLIAM F. D. ACKERMANN.